United States Patent
Sixt et al.

(10) Patent No.: US 11,028,268 B2
(45) Date of Patent: Jun. 8, 2021

(54) PROCESS FOR PRODUCING COMPOSITIONS CROSSLINKABLE TO ELASTOMERS

(71) Applicant: WACKER CHEMIE AG, Munich (DE)

(72) Inventors: Torsten Sixt, Mehring (DE); Franz Neuhauser, Geretsberg (AT); Josef Schnitzinger, Eggelsberg (AT)

(73) Assignee: WACKER CHEMIE AG, Munich (DE)

( * ) Notice: Subject to any disclaimer, the term of this patent is extended or adjusted under 35 U.S.C. 154(b) by 1 day.

(21) Appl. No.: 16/483,105

(22) PCT Filed: Feb. 28, 2017

(86) PCT No.: PCT/EP2017/054639
§ 371 (c)(1),
(2) Date: Aug. 2, 2019

(87) PCT Pub. No.: WO2018/157914
PCT Pub. Date: Sep. 7, 2018

(65) Prior Publication Data
US 2020/0239688 A1    Jul. 30, 2020

(51) Int. Cl.
*C08L 83/04*    (2006.01)

(52) U.S. Cl.
CPC ......... *C08L 83/04* (2013.01); *C08L 2205/025* (2013.01)

(58) Field of Classification Search
CPC ............................ C08L 83/04; C08L 2205/025
USPC ........................................................... 524/500
See application file for complete search history.

(56) References Cited

U.S. PATENT DOCUMENTS

| | | | |
|---|---|---|---|
| 3,504,051 A | 3/1970 | McVannel | |
| 4,460,761 A * | 7/1984 | Schiller | C08K 5/57 528/18 |
| 5,055,502 A | 10/1991 | Frances et al. | |
| 5,079,324 A | 1/1992 | Cocco et al. | |
| 5,728,794 A | 3/1998 | Friebe et al. | |
| 7,094,858 B2 | 8/2006 | Sixt et al. | |
| 8,618,235 B2 | 12/2013 | Bankwitz et al. | |
| 2004/0220331 A1* | 11/2004 | Sixt | C08K 5/5419 524/860 |
| 2010/0063190 A1 | 3/2010 | Bankwitz et al. | |

FOREIGN PATENT DOCUMENTS

| | | |
|---|---|---|
| EP | 0090409 A2 | 10/1983 |
| EP | 0098369 A2 | 1/1984 |
| EP | 1479720 A1 | 11/2004 |
| EP | 1700885 A1 | 9/2006 |
| EP | 1705222 A1 | 9/2006 |
| EP | 1788018 A1 | 5/2007 |
| EP | 1894975 A1 | 3/2008 |
| JP | 2014019794 A | 2/2014 |

* cited by examiner

*Primary Examiner* — Hui H Chin
(74) *Attorney, Agent, or Firm* — Brooks Kushman P.C.

(57) ABSTRACT

Neutral moisture curable organopolysiloxane compositions are prepared from silanol-stopped organopolysiloxanes, alkoxysilanes, aminosilanes, and ketoximino silanes, and contain less than 1 weight percent oximes upon storage.

14 Claims, No Drawings

PROCESS FOR PRODUCING COMPOSITIONS CROSSLINKABLE TO ELASTOMERS

CROSS REFERENCE TO RELATED APPLICATIONS

This application is the U.S. National Phase of PCT Appln. No. PCT/EP2017/054639 filed Feb. 28, 2017, the disclosure of which are incorporated in its entirety by reference herein.

BACKGROUND OF THE INVENTION

1. Field of the Invention

The invention relates to a process for producing compositions which are crosslinkable to give elastomers and are based on organosilicon compounds, more particularly neutrally crosslinking compositions based on organosilicon compounds, where essentially only alcohols are eliminated during the crosslinking.

2. Description of the Related Art

One-component silicone rubber mixtures which are storable in the absence of water but which vulcanize to elastomers at room temperature on ingress of water (RTV-1) are known. These products are employed in large quantities, for example, as joint sealants in the construction industry. The basis of these RTV-1 mixtures is formed by polydiorganosiloxanes which are terminated either with OH groups or with silyl groups which carry hydrolyzable groups. These products are stable on storage in the absence of moisture and polymerize under the influence of water or atmospheric moisture. Compositions of this kind, depending on the leaving group at the crosslinking stage, are referred to as acidic (leaving group generally acetic acid), basic (leaving group amines, such as dibutylamine) or neutral systems (leaving group alcohols or oximes). Neutral-crosslinking RTV-1 compositions play an important part on the basis of their versatility.

Particular problems are presented by products which release oximes, especially 2-butanone oxime (methyl ethyl ketoxime), as elimination products, since 2-butanone oxime has now been classified as carcinogenic. Because of the hazard potential, such RTV-1 mixtures have to be declared as a hazardous substance if the proportion of free 2-butanone oxime reaches or exceeds one percent. There are also workplace limits whereby the concentration of 2-butanone oxime must not exceed more than 1 $mg/m^3$ air, a figure which is exceeded by a multiple, however, on customary handling of oxime-crosslinking compositions during processing.

Oxime-crosslinking compositions which rather than 2-butanone oxime give off other oxime elimination products, such as 2-propanone oxime or 2-pentanone oxime, for example, are usually listed in the chemical registers only in certain regions and can therefore be used as a substitute only with considerable limitations. A further factor are significantly higher market prices, which considerably impairs the cost situation.

Alkoxy-crosslinking RTV-1 compositions are widely described, but the base polymers used in all of these formulations are organopolysiloxanes end-blocked with alkoxy groups, and these organopolysiloxanes must first be provided in a separate functionalization step, referred to as "endcapping", and the catalyst must generally be deactivated afterwards in order to prevent side-reactions. Examples of this are described in U.S. Pat. No. 5,055,502 A (catalysis with zinc beta-diketonates), U.S. Pat. No. 5,079,324 A (LiOH catalysis), U.S. Pat. No. 5,728,794 A (catalysis by partial esters of phosphoric acid), and U.S. Pat. No. 3,504,051 A (catalysis with sodium acetate). Simple production in a "one-step process" is therefore not possible.

Oxime compositions do not meet the requirement for declaration-free status under hazardous substance law, since they exceed the concentration of 1 wt % of free oxime, immediately or in the course of storage. Oximes are considered to be a health hazard; in particular 2-butanone oxime is classed as carcinogenic.

The dilemma which exists is therefore that alkoxy compositions are benign in terms of hazard potential but are more difficult to access. Oxime compositions, conversely, are easy to produce in technical terms, but have a hazard potential, or oxime compositions with less critical oxime crosslinkers are incompletely registered, in that they cannot be marketed globally and, furthermore, result in higher costs.

The following solutions attempt to get around these problems: EP 1 700 885 A1 and EP 98 369 A2 describe the use of specific silanes which carry alkoxy groups and oximo groups on the same silicon atom. Such silanes must be prepared specifically, are correspondingly expensive, and are not available worldwide on account of the partial lack of registration status. Because the oximo groups react preferentially, the critical limiting concentration of 1% for classification as a hazardous substance is quickly reached.

EP 1 788 018 A1 and EP 1 705 222 A1 describe oximosilanes which rather than 2-butanone oximo groups carry 2-propanone oximo groups. This prevents the release of 2-butanone oxime, but does release a different oxime in a similar amount. There is therefore no substantial reduction in the amount of free oximes in the compounded formulation. Such silanes are likewise expensive and likewise available only with great limitations, owing to the partial lack of registration status.

U.S. Pat. No. 8,618,235 B2 describes compounded formulations comprising oximosilane-terminated polymers, with alkoxysilane being introduced into these formulations as a scavenger. The release of the oximosilane during end-blocking and compounding cannot be prevented by this means, and in the examples, at 5.8 parts of oximosilane crosslinker per 100 parts of polymer, easily exceeds the critical mark of 1% free silane over the storage time. Accordingly, such products must likewise be labeled as hazardous substances.

U.S. Pat. No. 7,094,858 B2 describes an endcapping technology in which further compounding can take place after attainment of a defined residual silanol content. The higher the required degree of functionalization, the greater the time needed for endcapping with the alkoxysilanes, which are slow by comparison with oximosilanes. This affects the shelf life of the compounded formulations; with incomplete functionalization, the shelf life of the mixture suffers.

It is an object of the invention, therefore, to overcome these disadvantages of the prior art and to provide neutral-crosslinking silicone compositions which exhibit high stability in storage, where the limiting concentration of free oximes for classification as hazardous substances is reliably not exceeded over the storage time in the compositions, and which can be obtained without separate production of functionalized polymers. The object is achieved by the invention.

SUMMARY OF THE INVENTION

The invention is directed to a process for producing compositions crosslinkable to elastomers, characterized in that in a first step a mixture comprising
(1) organopolysiloxanes having at least two hydroxyl groups,
(2) alkoxysilanes of the formula

and/or partial hydrolysates thereof,
where R is a monovalent hydrocarbyl radical having 1 to 18 carbon atoms, preferably a methyl or vinyl radical, and
$R^1$ is identical or different and is a monovalent hydrocarbyl radical having 1 to 8 carbon atoms, preferably a methyl or ethyl radical, and
(3) organosilicon compounds having at least one radical containing basic nitrogen and bonded via carbon to silicon, preferably amino silanes,
is produced,
in a second step
(4) ketoximosilanes of the formula

and/or their partial hydrolysates,
where $R^2$ is a monovalent hydrocarbyl radical having 1 to 18 carbon atoms, preferably a methyl or vinyl radical, and
$R^3$ is identical or different and is a monovalent hydrocarbyl radical having 1 to 5 carbon atoms, preferably a methyl, ethyl, n-propyl or isopropyl radical,
are added to the mixture from the first step, where they are used in amounts of at most 1 wt %, based on the total weight of the composition,
with the proviso that
optionally further alkoxysilanes (2) and/or their partial hydrolysates and optionally further organosilicon compounds (3) are added in the second step or optionally in a third step subsequent to the second step, and subsequently
(5) condensation catalysts,
optionally
(6) fillers,
optionally
(7) adhesion promoters,
optionally
(8) plasticizers,
optionally
(9) stabilizers, and
optionally
(10) additives
are added to the reaction mixture from the second or optionally third step and are mixed with the reaction mixture.

DETAILED DESCRIPTION OF THE PREFERRED EMBODIMENTS

Examples of radicals R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals, hexyl radicals such as the n-hexyl radical, heptyl radicals such as the n-heptyl radical, octyl radicals such as the n-octyl radical and isooctyl radicals such as the 2,2,4-trimethylpentyl radical, nonyl radicals such as the n-nonyl radical, decyl radicals such as the n-decyl radical, dodecyl radicals such as the n-dodecyl radical, and octadecyl radicals such as the n-octadecyl radical; cycloalkyl radicals such as cyclopentyl, cyclohexyl, cycloheptyl, and methylcyclohexyl radicals; alkenyl radicals such as the vinyl, 5-hexenyl, cyclohexenyl, 1-propenyl, allyl, 3-butenyl, and 4-pentenyl radical; alkynyl radicals such as the ethynyl, propargyl, and 1-propynyl radicals; aryl radicals such as the phenyl, naphthyl, anthryl, and phenanthryl radical; alkaryl radicals such as o-, m-, and p-tolyl radicals, xylyl radicals, and ethylphenyl radicals; and aralkyl radicals, such as the benzyl radical and the α- and the β-phenylethyl radicals.

Examples of radicals $R^1$ are alkyl radicals having 1 to 8 carbon atoms.

Examples of radicals $R^2$ are alkyl and alkenyl radicals having 1 to 18 carbon atoms.

Examples of radicals $R^3$ are alkyl radicals having 1 to 5 carbon atoms.

In the process of the invention, preferably, in the first step organopolysiloxanes (1), alkoxysilanes (2) of the formula (I) and/or their partial hydrolysates, organosilicon compounds (3), and optionally plasticizers (8) are mixed with one another.

In the process of the invention, preferably, first of all, in a first step, the polyorganosiloxane (1) is introduced, optionally with plasticizer (8), and homogenized, and the alkoxysilane (2) and the organosilicon compound (3) are added and homogenized. Component (3) may be added together with component (2) or after addition of (2). The mixture is homogenized, preferably under the ambient pressure, such as under the pressure of 900 to 1100 hPa, optionally under reduced pressure, such as under a pressure of 50 to 300 hPa.

In a second step, in the process of the invention, the ketoximosilane (4) is added and mixed in. The mixture is homogenized, preferably under the ambient pressure, such as under the pressure of 900 to 1100 hPa, optionally under reduced pressure, such as under a pressure of 50 to 300 hPa.

Preferably, in the process of the invention, in a third step, further alkoxysilanes (2) of the formula (I) and/or their partial hydrolysates, and further organosilicon compounds (3), are added to the reaction mixture from the second step. Steps 2 and 3 may also take place jointly.

In the process of the invention, alkoxysilanes (2) and/or their partial hydrolysates are preferably used in a total amount of 1 to 25 parts by weight, preferably 2 to 15 parts by weight, based on 100 parts by weight of organopolysiloxane (1).

In the first step of the process of the invention, alkoxysilanes (2) and/or their partial hydrolysates are preferably used preferably in an amount of 1 to 5 parts by weight, based on 100 parts by weight of organopolysiloxane (1).

In the process of the invention, organosilicon compounds (3) are preferably used preferably in a total amount of 0.25 to 10 parts by weight, more preferably 1 to 7.5 parts by weight, based in each case on 100 parts by weight of the organopolysiloxanes (1).

In the first step of the process of the invention, organosilicon compounds (3) are preferably used in amounts of 0.1 to 1 part by weight, based on 100 parts by weight of organopolysiloxanes (1).

Subsequently
(5) condensation catalysts, preferably tin catalysts,
optionally
(6) fillers,
optionally (7) adhesion promoters,
optionally
(8) plasticizers,
optionally
(9) stabilizers, and
optionally
(10) additives
are added to the reaction mixture from the second step or, if a third step is carried out, to the reaction mixture from the third step, and are mixed with the reaction mixture.

The process of the invention preferably takes place in the absence of moisture at temperatures of 10 to 100° C., preferably 20 to 80° C., under pressures between 50 to 10,000 hPa, preferably between 10 to 2000 hPa.

If the process takes place in the presence of a gas phase, in other words in the form of an open or partially filled reaction space, then production preferably takes place with exclusion of moisture, with dried air or dried nitrogen being passed over or used for blanketing, at temperatures between 10 and 60° C., more preferably between 20 and 50° C., and under pressures between 50 to 1500 hPa, more preferably between 100 to 1100 hPa.

If the process takes place in a closed system in the absence of a gas phase, preferably in the form of a largely filled reaction space with a fill level of more than 90 vol %, production preferably takes place at temperatures between 10 and 80° C., more preferably between 20 and 60° C., and under pressures between 50 to 2000 hPa, more preferably between 100 to 1500 hPa.

Component (1) preferably comprises substantially linear organopolysiloxanes terminated by hydroxyl groups, more preferably organopolysiloxanes of the formula $$HO-[R^4{}_2SiO]_n-H \quad (III),$$

where $R^4$ may be identical or different and are optionally substituted hydrocarbyl radicals and n is an integer from 500 to 2000, preferably from 600 to 1700, more preferably from 600 to 1300.

One kind of organopolysiloxane (1) or a mixture of two or more kinds of organopolysiloxanes (1) may be used.

Examples of radicals R are the same as for radicals $R^4$.

The radical $R^4$ preferably comprises alkyl groups having 1 to 6 carbon atoms, more preferably the methyl radical.

The organopolysiloxanes (1) are preferably α,ω-dihydroxy-dialkylpolysiloxanes, more preferably α,ω-dihydroxypoly-dimethylsiloxanes.

Examples of organopolysiloxanes (1) are
(HO)Me$_2$SiO[SiMe$_2$O]$_x$SiMe$_2$(OH),
(HO)Me$_2$SiO[SiMe$_2$O]$_x$[SiMePhO]$_y$SiMe$_2$(OH)
where Me is methyl radical and Ph is phenyl radical,
where the individual siloxane units may be distributed randomly in the molecule,
where n is an integer from 500 to 2000, preferably 600 to 1700, more preferably 600 to 1300, and y is an integer such that y/x is preferably 0.01 to 0.1.

The organopolysiloxanes (1) used in accordance with the invention have a viscosity of preferably 10,000 to 700,000 mPa·s, more preferably of 20,000 to 400,000 mPa·s, most preferably of 50,000 to 200,000 mPa·s, in each case at 25° C.

The organopolysiloxanes (1) are commercial products and/or can be prepared by methods which are commonplace in silicon chemistry.

Examples of the alkoxysilanes (2) used in accordance with the invention are organyltrialkoxysilanes, such as methyltrimethoxysilane, ethyltrimethoxysilane, n-propyltrimethoxysilane, vinyltrimethoxysilane, methyltriethoxysilane, ethyltriethoxy-silane, n-propyltriethoxysilane, and vinyltriethoxysilane, and also the partial hydrolysates of the aforesaid silanes with a maximum of 10 silicon atoms.

The silanes (2) used in accordance with the invention are preferably methyltrimethoxysilane and vinyltrimethoxysilane.

Component (3) preferably comprises organosiloxanes or organosilanes having at least one radical containing basic nitrogen and bonded via carbon to silicon, preferably aminosilanes.

Particularly preferred in this context are aminosilanes of the formula $$ASi(OR^5)_3 \quad (IV),$$

where
A is a radical of the formula $-R^6-(NR^7-R^8-)_xNR^7{}_2$,
$R^5$ is identical or different and is a monovalent hydrocarbyl radical having 1 to 8 carbon atoms, preferably a methyl or ethyl radical,
$R^6$ is a divalent hydrocarbyl radical having 1 to 8 carbon atoms,
$R^7$ is identical or different and is a hydrogen atom or a monovalent hydrocarbyl radical having 1 to 8 carbon atoms, preferably a hydrogen atom,
$R^8$ is a divalent hydrocarbyl radical having 1 to 18 carbon atoms, preferably having 2 carbon atoms, and
x is 0, 1, 2 or 3, preferably 0 or 1.

Examples of particularly preferred aminosilanes are 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, 3-(2-aminoethyl)aminopropylmethyldimethoxysilane, 3-(2-aminoethyl)aminopropylmethyldiethoxysilane, 3-(N-cyclohexyl)aminopropyltrimethoxysilane, 3-(N-cyclohexyl)aminopropyltriethoxysilane.

Component (4) comprises ketoximosilanes of the formula $$R^2Si(ON=CR^3{}_2)_3 \quad (II)$$

and/or their partial hydrolysates,
where $R^2$ is a monovalent hydrocarbyl radical having 1 to 18 carbon atoms, preferably a methyl or vinyl radical, and
$R^3$ is identical or different and is a monovalent hydrocarbyl radical having 1 to 5 carbon atoms, preferably a methyl, ethyl, n-propyl or isopropyl radical.

Examples of ketoximosilanes (4) are
methyltris(dimethylketoxime)silane,
ethyltris(dimethylketoxime)silane,
vinyltris(dimethylketoxime)silane,
methyltris(methylethylketoxime)silane,
ethyltris(methylethylketoxime)silane,
vinyltris(methylethylketoxime)silane,
methyltris(methyl-n-propylketoxime)silane,
ethyltris(methyl-n-propylketoxime)silane,
vinyltris(methyl-n-propylketoxime)silane,
methyltris(methylisopropylketoxime)silane,
ethyltris(methylisopropylketoxime)silane,
vinyltris(methylisopropylketoxime)silane.

In the process of the invention, ketoximosilanes (4) of the formula (II) and/or their partial hydrolysates are used in amounts of at most 1 wt %, based on the total weight of the compositions. They are preferably used in amounts of at least 0.25 wt %, based on the total weight of the compositions. After the process of the invention, therefore, the amount of oxime in the compositions that is liberated during storage is preferably at most 1 wt %, based on the total weight of the compositions.

To provide the crosslinkable compositions of the invention, condensation catalysts (5), preferably tin catalysts, are preferably used. These are any desired condensation catalysts which may also have been present to date in compositions crosslinking to elastomers at room temperature on ingress of water.

Examples of such condensation catalysts (5) are organic compounds of calcium, strontium, barium, copper, silver, tin, zinc, zirconium, titanium, bismuth, lead, iron, and aluminum. Preferred among these condensation catalysts are alkyl titanates, alkyl zirconates, zinc carboxylates, titanium chelates, and organotin compounds, such as di-n-butyltin diacetate, di-n-butyltin dilaurate, di-n-octyltin diacetate, di-n-octyltin dilaurate, dibutyltin oxide, dioctyltin oxide, and reaction products of diorganotin diacylate or diorganotin oxide with silane or oligomer thereof that has per molecule at least two monovalent hydrocarbyl radicals as hydrolyzable groups, said hydrocarbyl radicals being optionally substituted by an alkoxy group and being bonded via oxygen to silicon; in these reaction products, all of the valences of the tin atoms are satisfied by oxygen atoms of the moiety $\equiv$SiOSn$\equiv$ and/or by SnC-bonded, monovalent organic radicals. Other examples of condensation catalysts (5) are basic organic compounds such as, for example, diazabicycloundecene, diazabicyclononane, guanidine compounds such as tetramethylguanidine, triazabicyclodecene, or N-methyltriazabicyclodecene.

The catalysts (5) are preferably organic dialkyltin carboxylates or reaction products thereof with alkoxysilanes, such as, for example, dioctyltin dilaurate, alkyl titanates, alkyl zirconates, titanium chelates such as diisobutoxybis-ethylacetoacetatotitanate, and also reaction products of diorganotin diacylate or diorganotin oxide with silane or oligomer thereof that has per molecule at least two monovalent hydrocarbyl radicals as hydrolyzable groups, the hydrocarbyl radicals being bonded via oxygen to silicon and being optionally substituted by an alkoxy group.

If catalysts (5) are used in the process of the invention, the amounts are preferably 0.0001 to 2 weight %, more preferably 0.001 to 1.5 weight %, based in each case on the total weight of the composition of the invention.

Examples of fillers (6) are nonreinforcing fillers, these being fillers having a BET surface area of up to 50 m$^2$/g, such as quartz, diatomaceous earth, calcium silicate, zirconium silicate, zeolites, metal oxide powders, such as aluminum, titanium, iron or zinc oxides and/or their mixed oxides, barium sulfate, calcium carbonate, gypsum, talc, kaolin, silicon nitride, silicon carbide, boron nitride, glass powders and plastics powders, such as polyacrylonitrile powders; reinforcing fillers, these being fillers having a BET surface area of more than 50 m$^2$/g, such as pyrogenically prepared silica, precipitated silica, precipitated calcium carbonate, carbon black, such as furnace black and acetylene black, and mixed silicon-aluminum oxides of high BET surface area; fibrous fillers, such as asbestos and also polymeric fibers. The stated fillers may have been hydrophobized, by treatment, for example, with organosilanes and/or organosiloxanes or by etherification of hydroxyl groups to alkoxy groups.

If fillers (6) are used, they are preferably fumed silica, precipitated or ground calcium carbonate, talc, and finely ground marble.

If the compositions of the invention comprise fillers (6), the amounts are preferably 5 to 200 parts by weight, more preferably 8 to 150 parts by weight, based in each case on 100 parts by weight of component (1). The compositions of the invention preferably comprise fillers (6).

In the process of the invention, preferably, fillers (6) are added to the reaction mixture from the second step or, if a third step is carried out, to the reaction mixture from the third step, and then tin catalysts (5), optionally adhesion promoters (7), optionally stabilizers (9), and optionally additives (10) are subsequently added and are mixed with one another.

Alternatively, adhesion promoters (7) are added before the addition of the fillers (6).

The adhesion promoter (7) optionally used in the compositions of the invention may comprise silanes and organopolysiloxanes with functional groups, such as, for example, those with amino, glycidoxypropyl, ureidopropyl, carbamato or methacryloyloxypropyl radicals.

Examples of adhesion promoters (7) are epoxysilanes, such as glycidoxypropyltrimethoxysilanes, glycidoxypropylmethyl-dimethoxysilane, glycidoxypropyltriethoxysilane or glycidoxypropylmethyldiethoxysilane, 2-(3-triethoxysilylpropyl)maleic anhydride, N-(3-trimethoxysilylpropyl) urea, N-(3-triethoxysilylpropyl)urea, N-(trimethoxysilylmethyl)urea, N-(methyldimethoxysilymethyl)urea, N-(3-triethoxysilylmethyl)urea, N-(3-methyldiethoxysilylmethyl) urea, O-methylcarbamatomethylmethyldimethoxysilane, O-methylcarbamatomethyltrimethoxysilane, O-ethylcarbamatomethylmethyldiethoxysilane, O-ethylcarbamatomethyltriethoxysilane, 3-methacryloyloxypropyltrimethoxysilane, methacryloyloxymethyltrimethoxysilane, methacryloyloxymethyl-methyldimethoxysilane, methacryloyloxymethyltriethoxysilane, methacryloyloxymethylmethyldiethoxysilane, 3-acryloyloxypropyl-trimethoxysilane, acryloyloxymethyltrimethoxysilane, acryloyloxymethylmethyldimethoxysilanes, acryloyloxymethyl-triethoxysilane, and acryloyloxymethylmethyldiethoxysilane, tris[3-trimethoxysilyl]propyl isocyanurate, tris[3-triethoxysilyl] propyl isocyanurate and also their partial condensates.

If the compositions of the invention comprise adhesion promoters (7), the amounts involved are preferably 0.2 to 4 parts by weight, more preferably 1 to 2.5 parts by weight, based in each case on 100 parts by weight of component (1). The compositions of the invention preferably comprise adhesion promoters (7).

The optionally employed plasticizers (8) are preferably silicone oils, different from component (1), having viscosities of between 5 and 10,000 mPas at 25° C., or hydrocarbon mixtures having viscosities of between 1 and 20 mPas at 40° C., more preferably having viscosities of between 2 and 7 mPas at 40° C.

If plasticizers (8) are used in the process of the invention, the amounts are preferably 5 to 100 parts by weight, more preferably 15 to 70 parts by weight, based in each case on 100 parts by weight of component (1). In accordance with the invention, plasticizers (8) are preferably used. In particular, plasticizers are used in the first process step.

Examples of the stabilizers (9) optionally used for producing the crosslinkable compositions of the invention are acidic phosphoric esters, phosphonic acids, and acidic phosphonic esters.

If the compositions of the invention comprise stabilizers (9), the amounts are preferably 0.01 to 1 part by weight, based on 100 parts by weight of component (1). The compositions of the invention preferably comprise stabilizers (9).

Examples of optionally employed additives (10) are fungicides, dyes, pigments, heat stabilizers, oxidation inhibitors, organic solvents, agents for influencing the electrical properties, such as conductive carbon black, flame retardants, and light stabilizers.

If the compositions of the invention comprise additives (10), the amounts are preferably 0.01 to 30 parts by weight, more preferably 0.05 to 2 parts by weight, based in each case on 100 parts by weight of component (1). The compositions of the invention preferably comprise additives (10).

The production of the crosslinkable compositions and storage thereof according to the invention preferably take place under substantially anhydrous conditions, so that the compositions cannot prematurely cure.

The process of the invention is carried out preferably under an inert gas atmosphere, more preferably under nitrogen.

For the crosslinking of the compositions of the invention, the normal water content of air is sufficient. Crosslinking of the compositions of the invention takes place preferably at room temperature. If desired, the crosslinking may also be carried out at temperatures higher or lower than room temperature and/or by means of concentrations of water that exceed the normal water content of the air.

The compositions produced in accordance with the invention can be used for all end-use applications for which it is possible to use compositions which crosslink to elastomers at room temperature on ingress of water.

The compositions produced in accordance with the invention are therefore outstandingly suitable, for example, as sealants for joints, including perpendicularly extending joints, and similar gaps of, for example, 10 to 40 mm in clear width, in, for example, buildings and in land, water, and air vehicles, or as adhesives or sealing compounds, in window construction or in the production of aquariums or glass cabinets, for example, and also for producing protective coatings, including those for surfaces exposed to the constant action of fresh or salt water, or for producing coatings which prevent sliding, or for producing elastomeric moldings, and also for insulating electric or electronic devices. Such composition may likewise be used in the technical sphere such as the sealing of housings, control apparatus, plant parts and engine parts, the encapsulation of components, or else as protective coatings.

In the examples described below, all figures for parts and percentages, unless otherwise indicated, are given by weight. Furthermore, all of the viscosity figures refer to a temperature of 25° C. Unless otherwise indicated, the examples which follow are carried out at a pressure of the ambient atmosphere, in other words between 900 and 1100 hPa, and at room temperature, in other words at about 22° C., or at a temperature which comes about when the reactants are combined at room temperature without additional heating or cooling.

Determination of the Viscosity:

The viscosity figures are based on the measurement according to DIN 53019 at 25° C.

The mechanical properties of the elastomers are each ascertained in accordance with the following standardized tests:

| Tensile strength | DIN 53504 with standard bar S3A |
| --- | --- |
| Elongation at break | DIN 53504 with standard bar S3A |
| Modulus | DIN 53504 with standard bar S3A |
| Shore A hardness | DIN 53505 |

Determination of the Oxime Content:

The oxime content of the crosslinkable composition is determined by gas chromatography (GC).

All of the necessary apparatus and the crosslinkable composition under test are prepared in a dry nitrogen atmosphere (glovebox). The first 5 g of the sample are discarded, and then 3 samples each comprising 250 mg of substance are introduced into 22 ml GC headspace vials and given a gastight seal with a teflon-coated septum.

The sample vials are heated at 90° C. for 10 minutes, then a sample is drawn from the gas phase over the crosslinkable composition, and transferred by syringe into the injector.

The carrier gas used for the gas chromatography is hydrogen, with a volume flow rate of 78 ml/min and a split ratio of 1:150; detection takes place by FID. The injector temperature is 250° C. The temperature profile starts with 110° C. at a heating rate of 40° C./min to the 250° C. endpoint. Column material used is a 10 m CP-Sil 19 CB silica column with an internal diameter of 0.1 mm and a coating thickness of 0.2 µm.

Determination of the Skin-Forming Time:

After the delivery of the RTV-1 composition from a cartridge, the formation of a skin is assessed by contacting the surface with a pencil of hardness HB. The skin-forming time is taken as the time which elapses until there is no longer a string formed between the composition and the pencil tip.

Comparative Example 1

310 g of an α,ω-dihydroxypolydimethylsiloxane having a viscosity of 80 000 mPa·s and 115 g of a trimethylsilyl-endblocked polydimethylsiloxane having a viscosity of 100 mPa·s were homogenized in a planetary mixer and mixed with 18 g of methyltris(methylethylketoximo)silane and also 6 g of vinyltris(methylethylketoximo)silane for 5 minutes. Subsequently 4 g of 3-(2-aminoethyl)aminopropyltrimethoxysilane were added and homogenized, followed by the addition of 43 g of fumed silica having a specific surface area of 150 m$^2$/g (available commercially under the trade name HDK® V15 from Wacker Chemie AG, Munich, DE). Following 10-minute homogenization under reduced pressure, 0.25 g of dibutyltin diacetate was mixed in under reduced pressure. The product produced was dispensed for keeping into moisture-tight containers.

Comparative Example 2

310 g of an α,ω-dihydroxypolydimethylsiloxane having a viscosity of 80,000 mPa·s and 115 g of a trimethylsilyl-endblocked polydimethylsiloxane having a viscosity of 100 mPa·s were homogenized in a planetary mixer and mixed with 14 g of vinyltrimethoxysilane and also 2 g of 3-(2-aminoethyl) aminopropyltrimethoxysilane for 5 minutes. Subsequently a further 4 g of 3-(2-aminoethyl)aminopropyltrimethoxysilane were mixed in, followed by the addition of 43 g of fumed silica having a specific surface area of 150 m$^2$/g (available commercially under the trade name HDK® V15 from Wacker Chemie AG, Munich, DE). Following 10-minute homogenization under reduced pressure, 0.25 g of dibutyltin diacetate was mixed in under reduced pressure. The product produced was dispensed for keeping into moisture-tight containers.

Inventive Example 1

310 g of an α,ω-dihydroxypolydimethylsiloxane having a viscosity of 80,000 mPa·s and 115 g of a trimethylsilyl-endblocked polydimethylsiloxane having a viscosity of 100 mPa·s were homogenized in a planetary mixer and mixed with 8.7 g of vinyltrimethoxysilane and also 1.3 g of 3-(2-aminoethyl) aminopropyltrimethoxysilane.

In a second step, after 8 minutes of stirring, 5 g of vinyltris(methylethylketoximo)silane were added and mixing continued for 2 minutes. In a third step, a further 5 g of vinyltrimethoxysilane and 5 g of 3-(2-aminoethyl)aminopropyltrimethoxysilane were added and homogenized, followed by the addition of 43 g of fumed silica having a specific surface area of 150 m²/g (available commercially under the trade name HDK® V15 from Wacker Chemie AG, Munich, DE). Following 10-minute homogenization under reduced pressure, 0.25 g of dibutyltin diacetate was mixed in under reduced pressure. The product produced was dispensed for keeping into moisture-tight containers.

Inventive Example 2

The procedure of inventive example 1 was repeated, with the modification that in the second step, instead of 5 g of vinyltris(methylethylketoximo)silane, 5 g of methyltris(methylethylketoximo)silane were added.

Inventive Example 3

The procedure of inventive example 1 was repeated, with the modification that in the second step, as in inventive example 1, 5 g of vinyltris(methylethylketoximo)silane were added, while in the third step 7 g rather than 5 g of vinyltrimethoxysilane were added.

Inventive Example 4

The procedure of inventive example 1 was repeated with the modification that in the second step, instead of 5 g, 2.5 g of vinyltris(methylethylketoximo)silane were added, and in the third step 8.5 g rather than 5 g of vinyltrimethoxysilane were added.

After homogenization under reduced pressure, the compounded formulation obtained in each case according to inventive examples 1-4 and comparative examples 1 and 2 is dispensed into moisture-tight containers and the compounded formulations are each crosslinked freshly after production and also crosslinked after storage at 14d/70° C. For this purpose, the compounded formulation obtained in each case is applied in a layer 2 mm thick to a PE film and left to stand at 23° C. and 50% relative humidity. Vulcanization is rated as good if after 24 hours the composition is vulcanized right through.

The results for the determination of the oxime content and the skin-forming time (fresh and after storage) are summarized in Table 1.

The results for the determination of the mechanical properties of the elastomers (fresh and after storage) are summarized in Tables 2 and 3.

TABLE 1

Determination of the oxime content and of the skin-forming time fresh after production and after storage

| | Comp. 1 | Comp. 2 | Inv. 1 | Inv. 2 | Inv. 3 | Inv. 4 |
|---|---|---|---|---|---|---|
| Methyl ethyl ketoxime content (NMR) | 1.70% | 0.0% | 0.50% | 0.50% | 0.40% | 0.30% |
| Skin-forming time fresh (min) | 8 | 24 | 14 | 14 | 14 | 14 |

TABLE 1-continued

Determination of the oxime content and of the skin-forming time fresh after production and after storage

| | Comp. 1 | Comp. 2 | Inv. 1 | Inv. 2 | Inv. 3 | Inv. 4 |
|---|---|---|---|---|---|---|
| Skin-forming time after storage 14 d/ 70° C. (min) | 24 | 80 | 27 | 40 | 30 | 28 |

TABLE 2

Mechanical properties of the elastomers determined fresh after production

| | Comp. 1 | Comp. 2 | Inv. 1 | Inv. 2 | Inv. 3 | Inv. 4 |
|---|---|---|---|---|---|---|
| Shore A hardness | 23 | 20 | 21 | 22 | 20 | 20 |
| Tensile strength (N/mm²) | 1.8 | 1.1 | 1.0 | 1.3 | 1.2 | 1.1 |
| Elongation at break (%) | 494% | 410 | 350% | 407% | 428% | 410% |
| Strain at 100% (N/mm²) | 0.45 | 0.35 | 0.39 | 0.43 | 0.38 | 0.35 |

TABLE 3

Mechanical properties of the elastomers determined after storage of the compositions (14 d/70° C.)

| | Comp. 1 | Comp. 2 | Inv. 1 | Inv. 2 | Inv. 3 | Inv. 4 |
|---|---|---|---|---|---|---|
| Shore A hardness | 18 | 15 | 13 | 17 | 15 | 17 |
| Tensile strength (N/mm²) | 1.4 | 1.1 | 1.2 | 1.2 | 1.1 | 1.2 |
| Elongation at break (%) | 569% | 533% | 595% | 519% | 533% | 504% |
| Strain at 100% (N/mm²) | 0.35 | 0.29 | 0.26 | 0.32 | 0.29 | 0.32 |

Comparative example 1 shows the known behavior of oxime compositions: good sag resistance and a skin-forming time of less than 40 min even after accelerated aging at 70° C., but, with 1.7% free oxime, a figure which results in the compounded formulation being classed as a hazardous substance. Comparative example 2 initially, after production, exhibits a non-sag-resistant consistency, but this changes after a short storage time at room temperature. A striking result here is the prolongation of the skin-forming time to a figure of 80 min after just 2 weeks on storage at 70° C.

Inventive examples 1-4 show good and very stable paste properties and also good mechanical properties even after 70° C. storage.

Inventive examples 1-4 with the compositions of the invention show skin-forming times after storage of between 27 and 40 min and hence a better stability on storage than the alcohol compositions of comparative example 2, with a skin-forming time more than twice as long after storage, of 80 min. In particular, inventive examples 1-4 feature a free oxime content of only 0.3 to 0.5% and hence well below 1%, and therefore do not need to be classed as hazardous substances. In contrast to this, the oxime compositions according to comparative experiment 1 have a free oxime content of 1.7%, and thus much higher than 1%, and must therefore be classed as hazardous substances.

The invention claimed is:

1. A process for producing moisture curable compositions crosslinkable to elastomers, comprising:
in a first step, providing a mixture comprising
(1) at least one organopolysiloxane having at least two hydroxyl groups,
(2) at least one alkoxysilane of the formula $$RSi(OR^1)_3 \qquad (I),$$

and/or partial hydrolysates thereof,
where R is a monovalent hydrocarbyl radical having 1 to 18 carbon atoms, and
$R^1$ is identical or different and is a monovalent hydrocarbyl radical having 1 to 8 carbon atoms, and
(3) organosilicon compounds having at least one radical containing basic nitrogen and bonded via carbon to silicon,
in a second step, adding to the mixture of the first step
(4) at least one ketoximosilane of the formula $$R^2Si(ON\!\!=\!\!CR^3{}_2)_3 \qquad (II)$$

and/or their partial hydrolysates,
where $R^2$ is a monovalent hydrocarbyl radical having 1 to 18 carbon atoms, and
$R^3$ is identical or different and is a monovalent hydrocarbyl radical having 1 to 5 carbon atoms, in amounts of at most 1 wt %, based on the total weight of the composition,
and optionally adding further alkoxysilanes (2) and/or their partial hydrolysates and optionally further organosilicon compounds (3) in the second step or optionally in a third step subsequent to the second step, and adding and mixing
(5) condensation catalysts,
optionally
(6) fillers,
optionally
(7) adhesion promoters,
optionally
(8) plasticizers,
optionally
(9) stabilizers, and
optionally
(10) additives different from components (1)-(9), wherein in the third step, further alkoxysilanes (2) of the formula (I) and/or their partial hydrolysates and further organosilicon compounds (3) are added to the reaction mixture from the second step.

2. The process of claim 1, wherein in the first step, organopolysiloxanes (1), alkoxysilanes (2) of the formula (I) and/or their partial hydrolysates, organosilicon compounds (3), and optionally plasticizers (8) are mixed with one another.

3. The process of claim 1, wherein alkoxysilanes (2) and/or their partial hydrolysates are used in a total amounts of 1 to 25 parts by weight, based on 100 parts by weight of organopolysiloxane (1).

4. The process of claim 1, wherein alkoxysilanes (2) and/or their partial hydrolysates are used in a total amounts of 2 to 15 parts by weight, based on 100 parts by weight of organopolysiloxane (1).

5. The process of claim 1, wherein alkoxysilanes (2) and/or their partial hydrolysates are used in the first step in an amount of 1 to 5 parts by weight, based on 100 parts by weight of organopolysiloxans (1).

6. The process of claim 1, wherein at least one organopolysiloxane (1) has the formula $$HO\!-\![R^4{}_2SiO]_n\!-\!H \qquad (III),$$

where
$R^4$ is identical or different and is an optionally substituted hydrocarbyl radical having 1 to 18 carbon atoms and
n is an integer from 500 to 2000.

7. The process of claim 1, wherein at least one organosilicon compound (3) has at least one radical containing basic nitrogen and is bonded via carbon to silicon, and comprises an aminosilane of the formula $$ASi(OR^5)_3 \qquad (IV),$$

where
A is a radical of the formula $-R^6-(NR^7-R^8-)_xNR^7{}_2$,
$R^5$ is identical or different and is a monovalent hydrocarbyl radical having 1 to 8 carbon atoms,
$R^6$ is a divalent hydrocarbyl radical having 1 to 8 carbon atoms,
$R^7$ is identical or different and is a hydrogen atom or a monovalent hydrocarbyl radical having 1 to 8 carbon atoms,
$R^8$ is a divalent hydrocarbyl radical having 1 to 18 carbon atoms, and x is 0, 1, 2 or 3.

8. The process of claim 1, wherein organosilicon compounds (3) are used in a total amount of 0.25 to 10 parts by weight, based on 100 parts by weight of the organopolysiloxanes (1).

9. The process of claim 1, wherein organosilicon compounds (3) are used in a total amount of 1 to 7.5 parts by weight, based on 100 parts by weight of the organopolysiloxanes (1).

10. The process of claim 1, wherein organosilicon compounds (3) are used in the first step in amounts of 0.1 to 1 part by weight, based on 100 parts by weight of organopolysiloxanes (1).

11. The process of claim 1, wherein at least one condensation catalyst (5) is a tin catalyst.

12. The process of claim 1, wherein additives (10) comprise at least one pigments, dyes, odorants, fungicides, oxidation inhibitors, agents for influencing the electrical properties, flame retardants, light stabilizers, heat stabilizers, thixotropic agents, and/or organic solvents.

13. The process of claim 1, wherein fillers (6) are added to the reaction mixture from the second or optionally from the third step and then tin catalysts (5), optional adhesion promoters (7), optional stabilizers (9), and optional additives (10), when present, are subsequently added and mixed with one another.

14. The process of claim 1, wherein adhesion promoters (7), and thereafter fillers (6) are added to the reaction mixture from the second or optionally from the third step and then tin catalysts (5), optional stabilizers (9), and optional additives (10), when present, are subsequently added and mixed with one another.

* * * * *